(12) United States Patent
Pierce

(10) Patent No.: US 8,833,219 B2
(45) Date of Patent: Sep. 16, 2014

(54) WIRE SAW

(75) Inventor: Kenneth R. Pierce, Arlington Heights, IL (US)

(73) Assignee: Illinois Tool Works Inc., Glenview, IL (US)

( * ) Notice: Subject to any disclaimer, the term of this patent is extended or adjusted under 35 U.S.C. 154(b) by 1315 days.

(21) Appl. No.: 12/634,271

(22) Filed: Dec. 9, 2009

(65) Prior Publication Data

US 2010/0186564 A1     Jul. 29, 2010

Related U.S. Application Data

(60) Provisional application No. 61/147,163, filed on Jan. 26, 2009, provisional application No. 61/161,189, filed on Mar. 18, 2009.

(51) Int. Cl.
| | |
|---|---|
| *B26D 3/16* | (2006.01) |
| *B26D 7/02* | (2006.01) |
| *B23D 57/00* | (2006.01) |
| *B26D 1/48* | (2006.01) |
| *B26D 7/01* | (2006.01) |

(52) U.S. Cl.
CPC .............. *B23D 57/0007* (2013.01); *B26D 3/16* (2013.01); *B26D 2007/013* (2013.01); *B23D 57/0053* (2013.01); *B26D 7/02* (2013.01); *B23D 57/0061* (2013.01); *B26D 1/48* (2013.01)
USPC .............. 83/200.1; 83/651.1; 83/745; 30/102; 405/156

(58) Field of Classification Search
CPC ........ B23D 57/07; B23D 57/46; B23D 57/61; B23D 57/69; B23D 57/84; B26D 1/547; B26D 3/16

USPC ............ 83/456, 648, 657, 745, 200.1, 307.1, 83/307.2, 651.1; 30/92, 116, 380, 274, 30/378, 101, 102; 451/296; 166/361; 125/21; 294/113; 60/431; 405/156
See application file for complete search history.

(56) References Cited

U.S. PATENT DOCUMENTS

| | | | |
|---|---|---|---|
| 2,617,678 A | 11/1952 | Kelso | |
| 3,172,384 A | 3/1965 | Tipton | |
| 3,820,424 A * | 6/1974 | George, Jr. | 82/101 |
| 3,958,332 A * | 5/1976 | Gates et al. | 30/380 |
| 4,091,533 A | 5/1978 | Saumell | |
| H45 H * | 4/1986 | Gilmore | 30/94 |
| 4,705,331 A | 11/1987 | Britton | |

(Continued)

FOREIGN PATENT DOCUMENTS

| | | |
|---|---|---|
| EP | 0 540 834 B2 | 5/2004 |
| NO | 180185 | 4/2008 |
| WO | WO2009/146294 | 12/2009 |

*Primary Examiner* — Laura M Lee
(74) *Attorney, Agent, or Firm* — Klintworth & Rozenblat IP LLC

(57) ABSTRACT

A device for cutting a length of pipe includes a clamp portion for clamping around a length of pipe and a bow moveable with respect to the clamp portion that retains a loop of diamond embedded wire. The device further includes a feed for driving the bow with respect to the clamp portion and a detector for detecting bending of the wire and a control responsive to the detector for controlling feed rates. The device is made of modular parts and has synchronizing arms for clamping around a length of pipe. In one embodiment, the wheels are retained in enclosures with slots through which the cutting wire passes.

11 Claims, 18 Drawing Sheets

(56) References Cited

U.S. PATENT DOCUMENTS

| | | |
|---|---|---|
| 5,361,748 A | 11/1994 | Matteucci |
| 5,524,517 A | 6/1996 | Robinson |
| 6,267,037 B1 | 7/2001 | McCoy, Jr. |
| 7,406,905 B2 | 8/2008 | Lawler et al. |
| 7,645,093 B1 | 1/2010 | Clark et al. |
| 7,922,424 B2 | 4/2011 | Clark, II |
| 8,029,036 B2 * | 10/2011 | Kline et al. ............... 294/67.31 |
| 8,047,194 B2 * | 11/2011 | Rieger et al. ................ 125/21 |
| 8,109,693 B1 | 2/2012 | Clark, II |
| 8,465,227 B1 | 6/2013 | Clark, II |
| 8,475,081 B2 | 7/2013 | Clark et al. |
| 2008/0022830 A1 | 1/2008 | Lawler et al. |
| 2009/0314149 A1 * | 12/2009 | Clark, II .................... 83/651.1 |
| 2010/0186564 A1 | 7/2010 | Pierce |
| 2012/0174723 A1 * | 7/2012 | Matteucci ..................... 83/794 |

* cited by examiner

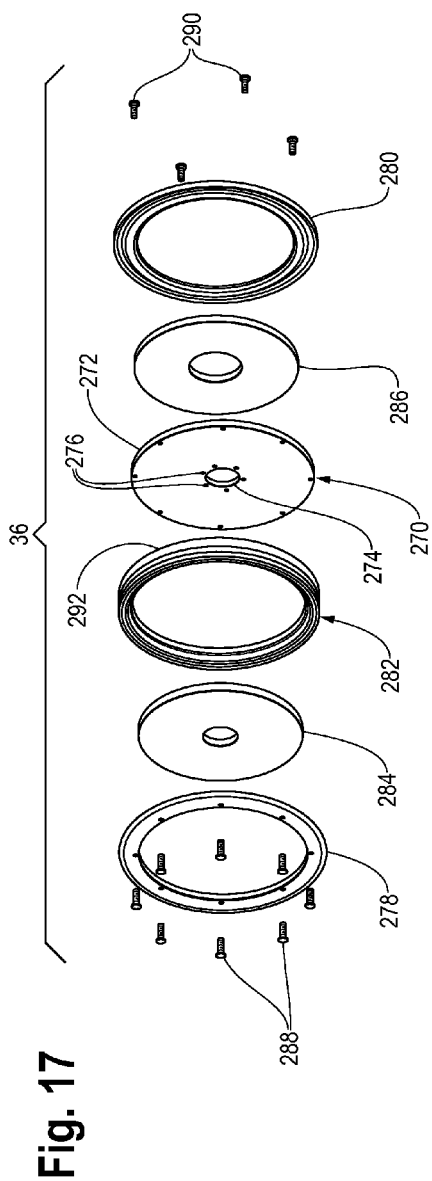
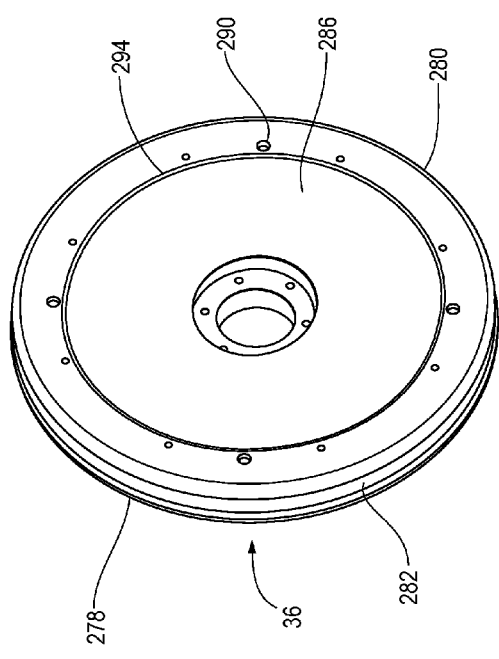
Fig. 17
Fig. 18

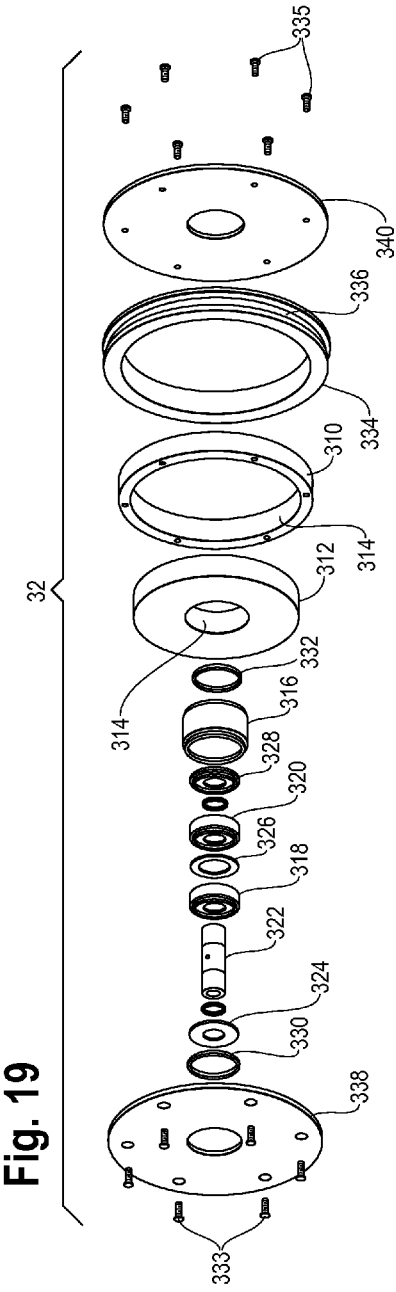
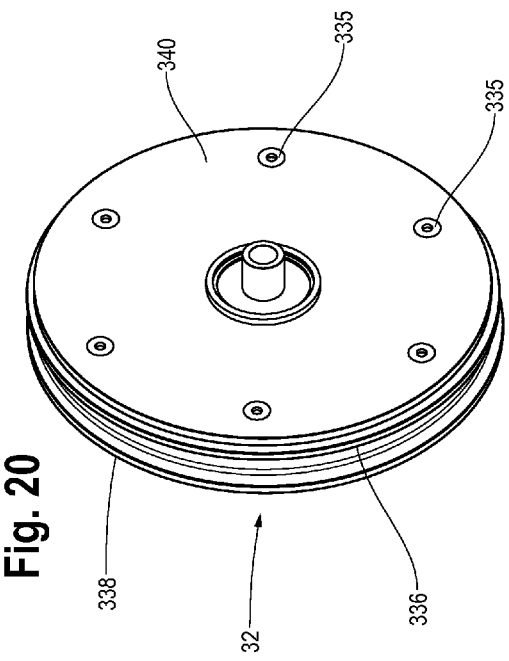
Fig. 19
Fig. 20

WIRE SAW

The applicant claims priority from his two provisional applications, the first filed Jan. 26, 2009 and assigned Ser. No. 61/147,163, and the second filed Mar. 18, 2009 and assigned Ser. No. 61/161,189. The present application relates to wire saws of the type used to cut pipe and in particular underwater pipe such as used to support offshore oil rigs and the like.

BACKGROUND OF THE INVENTION

Offshore oil rigs are supported by vertical pipes the lower ends of which are embedded in the ocean floor and the upper end of which extends above the surface. When an oil rig is abandoned, the supporting pipes must be sawed so as not to obstruct sea traffic or animal life.

Metal pipe used to support underwater structures come in diameters from the very smallest available up to at least 72 inches. A machine suitable for cutting such pipe must be resistant to deterioration caused by salt water and must be sized to accept and machine the particular diameter of pipe to be cut. Presently, it is the practice to provide a plurality of cutting machines in varying sizes to accommodate the different sizes of pipe. Accordingly, many different sizes of machines must be kept in inventory to deal with a complicated project involving the cutting of numerous sizes of submerged pipe.

One problem that that has plagued machines adapted to cut submerged pipe is that the machines typically include a plurality of contact pads that contact the surface of the pipe, and a pair of moveable arms that compress the pipe against the contact pads. The machine applies a loop of diamond embedded wire against the surface of the pipe and rotates the loop to cut the pipe. Where the pipe is to be cut thousands of feet below surface, the machine must grasp the pipe and undertake the cut without visual supervision. It has been found, however, that frequently the grasping arms do not force the length of pipe equally against all the retaining pads such that the device is somewhat skewed relative to the pipe. As a consequence of the skewed pipe, the machine may shake during the cutting process or realign itself against the pipe causing the cutting wire to snap.

The loop of wire that is the cutting element cannot be kept taut as it is applied against the surface but must be allowed to bend such that the longitudinal strength limitations of the wire are not exceeded. Currently it is the practice to provide a space consuming serpentine wire take-up assembly that will retain tension on the wire and allow the loop to be expanded as the cutting device is applied against the pipe. The serpentine wire take-up significantly enlarges the size of the machine and thereby makes it more cumbersome to handle.

It would be desirable to provide an improved machine that overcomes or reduces some of the forgoing problems. Specifically, it would be desirable to have a machine suitable for cutting a wide variety of sizes of pipe diameters such that a fewer number of machines are needed to cut all the sizes of submerged pipe that are available. It would also be desirable to provide a wire cutting machine that will more accurately grasp a length of pipe without requiring visual supervision and that does not require a serpentine wire take-up to prevent breakage of the wire.

The surrounding water in which the machine operates also causes resistance to movement and thereby reduces its efficiency. A major portion of the resistance generated occurs as a result of the rotation of the various wheels around which the loop of wire is moved. Even a wheel with a smooth surface will apply centrifugal forces to the surrounding water thereby reducing the efficiency of the machine.

One of the wheels is a drive wheel which applies force to the cutting wire causing it to rotate and cut the metal of a pipe. The drive wheel must therefore have a surface that contacts the cutting wire and has a sufficiently high coefficient of friction to apply the force to the wire needed to cut the metal of the pipe. The wheels of existing wire saws, excluding the drive wheels, are mounted on a shaft that extends between parallel plates, one on each side of the wheel such that an annular insert around the wheel cannot be replaced in the field.

Existing wire saws provide a strip of rubberized material that is bonded into an annular groove around the circumference of the wheel for engaging the surface of the wire and applying force to the wire causing it to rotate. The rubberized material within the groove however is worn away rapidly as the saw is used and therefore must be replaced often. Furthermore, since the rubberized material is in the form of a strip, the deterioration of the material occurs most rapidly where the ends of the strip meet each other at one location around the circumference of the wheel. It would be desirable to provide a resistive surface for a drive wheel that is more resistant to deterioration and does not require assembly that leaves a junction that connects two ends of a strip. It is also desirable that the material that forms the resistive surface be easily replaceable so that the machine can be serviced in the field.

To a lesser extent, the surfaces of the various guide wheels that also engage the cutting wire of a wire saw must have a degree of flexibility so as to minimize damage to the cutting wire as it moves around the guide wheel, and it is common therefore to provide a rubberized insert that fits within the groove of each guide wheel. The softer material in the groove of the guide wheel that engages the cutting wire must also be readily replaceable. It would be desirable to provide wheels for the wire saw that can receive annular inserts that can be replaced while the machine is in the field.

SUMMARY OF THE INVENTION

Briefly, the present invention is embodied in a device for cutting a length of pipe that includes a clamp portion for clamping around a length of pipe and a bow attached to the clamp portion for retaining a loop of diamond embedded wire. The bow is linearly moveable with respect to the clamp portion to apply the moving wire against the surface of a length of pipe clamped in the clamp portion. The device further includes a feed for driving the bow with respect to the clamp portion and thereby urging the length of wire across the diameter of the pipe to thereby cut the pipe.

In accordance with the invention, the clamp portion includes a plurality of pads for contacting against the surface of the pipe and at least one moveable arm for urging the pipe against the pads. A roller is provided at the distal end of the arm to allow the distal end of the arm to move along the surface of the pipe with a minimum of friction thereby allowing the arm to reach around the pipe and pull it against the pads without wedging into misalignment.

Preferably, the machine has two arms and the invention further provides for a synchronizing element between the first arm and the second arm for coordinating movement of the two arms such that neither arm will move faster than the other.

In another embodiment of the invention, a wire take-up is provided that allows enough slack within the length of wire to permit sufficient bending of the wire as it cuts to prevent wire snapping. The device further includes a detector, for detecting the degree of bending of the wire and a control responsive to the detector for controlling the feed rate in response to the bending of the wire.

A plurality of wheels on the bow engage the diamond embedded wire and retain the wire as it moves in a circular path to cut the length of pipe. One of the wheels is a drive wheel having an annular groove in its outer surface into which the cutting wire is received. The wheel includes a first annular side member and an opposing second annular side member each of which has circular outer circumferences and attach to opposite sides of a circular central body. The outer circumferences of the side members are spaced from each other leaving a groove between them for receiving the diamond embedded cutting wire. The first side member is retained to the remaining portions of the wheel by means of a plurality of removable fasteners and an annular composite insert, preferably made of urethane, is fitted into the groove formed between the spaced apart outer circumferences of the two side members. To replace a composite insert that increases the friction between the wire and the wheel, a plurality of fasteners are removed thereby permitting the first side member to be removed while the second side member remains attached to the machine. This allows easy replacement of the annular composite insert. Since the insert extends around three hundred and sixty degrees, the insert does not have a union of two ends of a strip of material wrapped around the groove of a wheel as is the case with the prior art and therefore has a longer useful life.

In another embodiment of the invention, each of the various wheels that drive the cutting wire is enclosed in stationary housings. As a result, the rotating surfaces of the wheel do not contact the surrounding water thereby minimizing the centrifugal forces applied to the surrounding water.

In yet another embodiment of the invention, the machine is modular in construction, such that the position of the clamping arms are adjustable with respect to the frame so as to be made suitable for grasping a wide range of sizes of pipe.

BRIEF DESCRIPTION OF THE DRAWINGS

A better understanding of the invention will be had after a reading of the following detailed description taken in conjunction with the drawings wherein:

FIG. 17 is an exploded isometric view of the drive wheel shown in FIG. 9;

FIG. 18 is an isometric view of the assembled drive wheel shown in FIG. 17;

FIG. 19 is an exploded isometric view of one of the guide wheels shown in FIG. 9, FIG. 20 is an isometric view of assembled guide wheel shown in FIG. 19;

DETAILED DESCRIPTION OF PREFERRED EMBODIMENT

Figure 1:
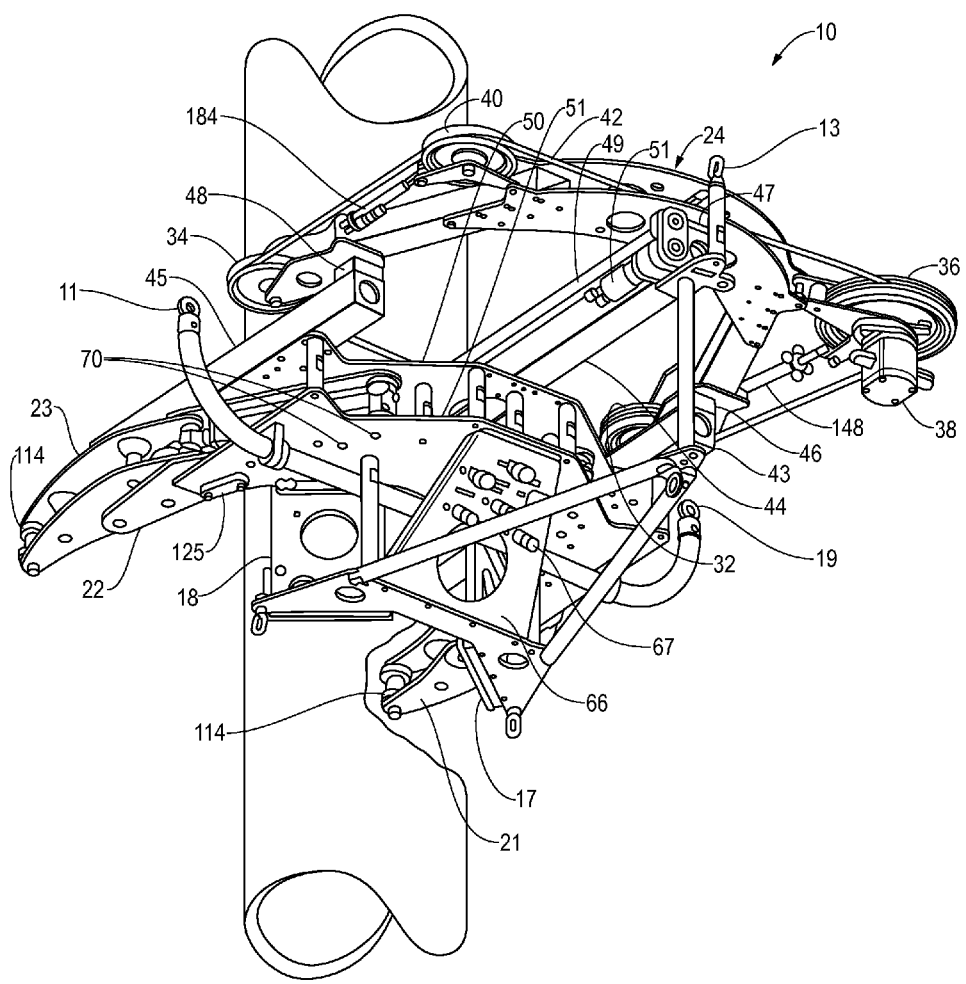
FIG. 1 is an isometric view of a wire saw in accordance with the present invention.

Referring to FIGS. 1 through 4, a wire cutting machine 10 for cutting a length of pipe 12 includes a frame 14 having a plurality of contact pads 15, 16, 17, 18 thereon for positioning the frame 14 against the surface of the pipe 12. The machine 10 is suspended at the desired elevation and orientation by a plurality of wires, not shown, that extend downward from the surface with each wire attaching to a connector 11, 13, 19 on the machine 10.

Mounted with respect to the frame 14 are first and second arm assemblies each of which includes an upper arm 20, 22 attached to the frame 14 and a lower arm 21, 23 movable with respect to the associated upper arms 20, 22 for reaching around the outer circumference of the pipe 12 and retain the frame 14 firmly against the pads 15-18. The machine 10 further includes a bow 24 having a central portion 26 and two generally arched arms 28, 30 having guide wheels 32, 34 at the distal ends thereof. Positioned near the central portion 26 is a drive wheel 36 which is drivingly rotated by an appropriate motor 38. Mounted on the opposite side of the central portion 26 is a take-up wheel 40, and wrapped around the four wheels 32, 34, 36, 40 is a loop of diamond embedded wire 42 of the type commonly known in the art. To cut across the length of pipe 12, the bow 24 is retained to the frame 14 by a plurality of elongate vertically oriented parallel tracks 43, 44, 45 attached on the frame 14 with each track 43, 44, 45 receiving a slideable track follower 46, 47, 48 mounted on the bow 24 so as to be longitudinally moveable in a plane perpendicular to the length of the pipe 12. The bow 24 is driven with respect to the frame 14 by a threaded feed shaft 49 rotated by a motor 51 to thereby force the portion of the wire 42 that extends between wheels 32, 34 at the ends of the arms 28, 30 through the pipe 12 to sever the pipe 12.

Figure 2:
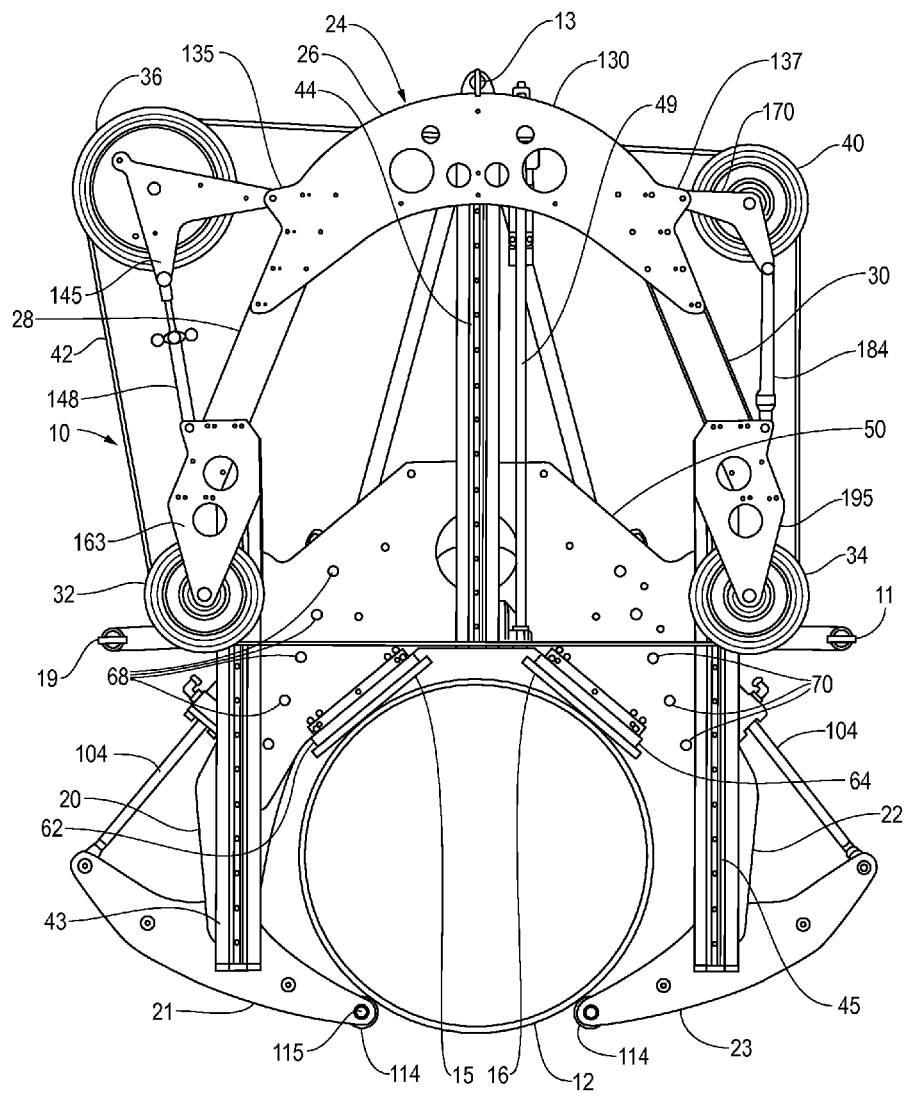
FIG. 2 is an end elevational view of the wire saw shown in FIG. 1 grasping a length of pipe.
Figure 3:
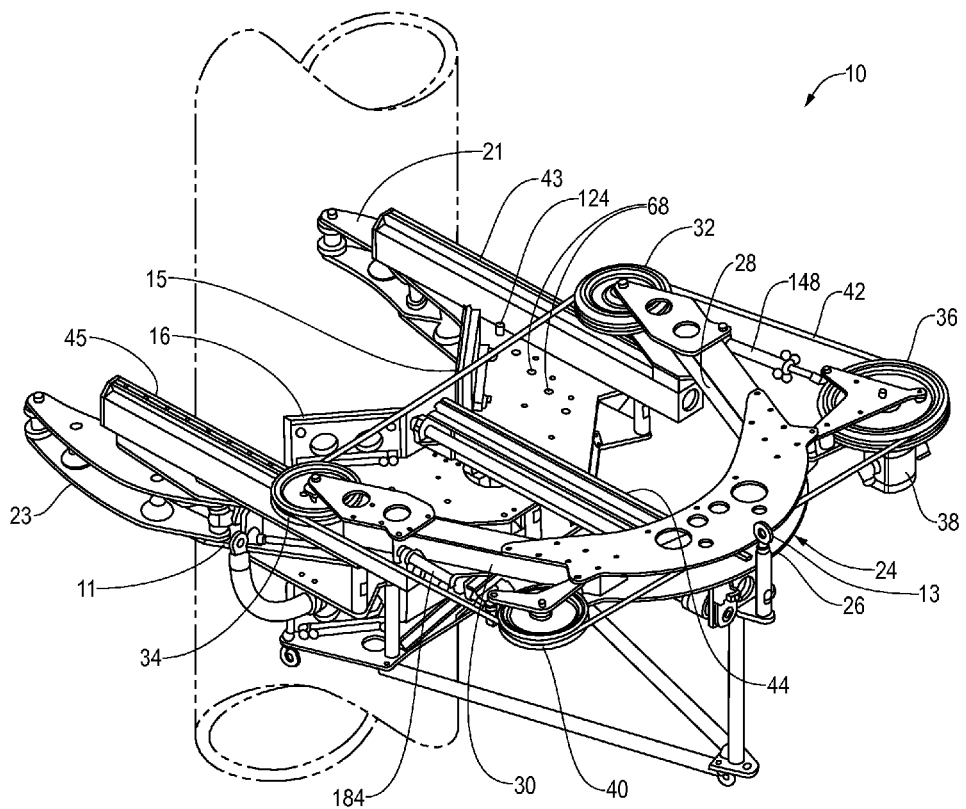
FIG. 3 is another isometric view of the wire saw shown in FIG. 1 showing the opposite side thereof.
Figure 4:
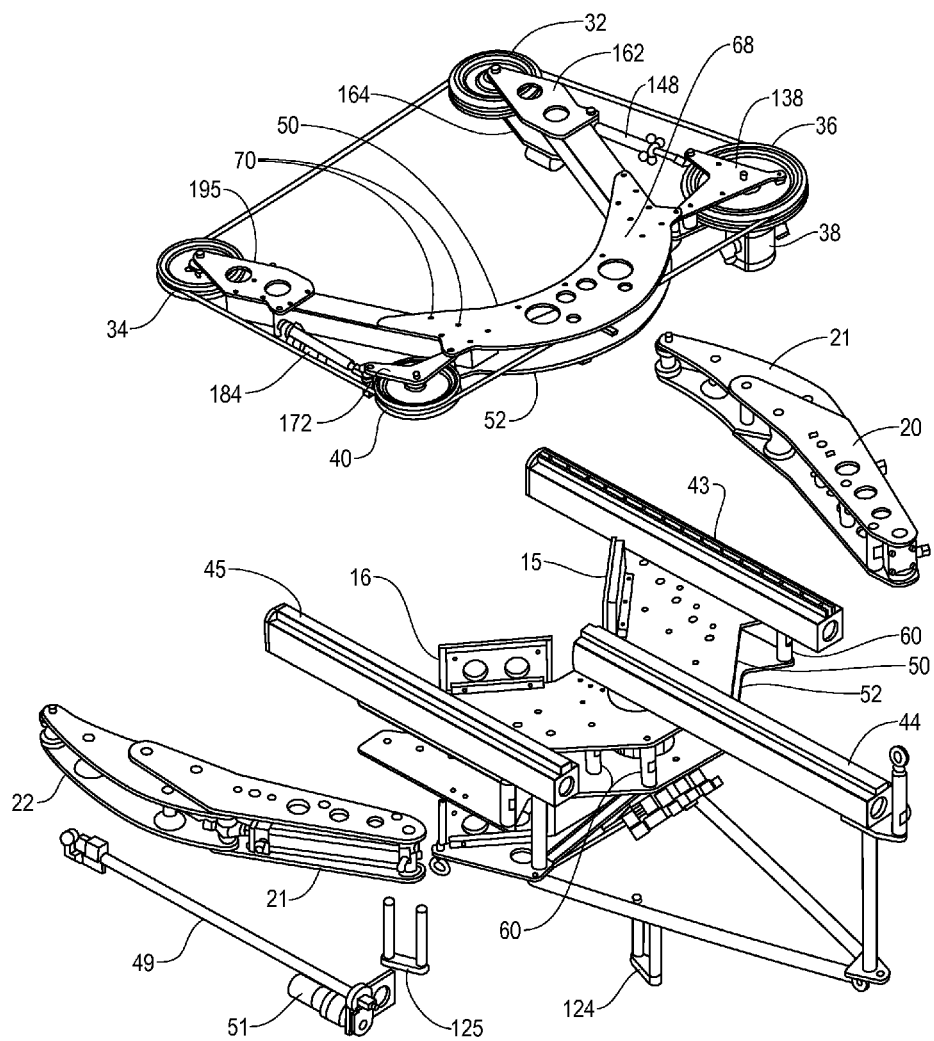
FIG. 4 is an exploded isometric view of the wire saw shown in FIG. 1.
Figure 5:
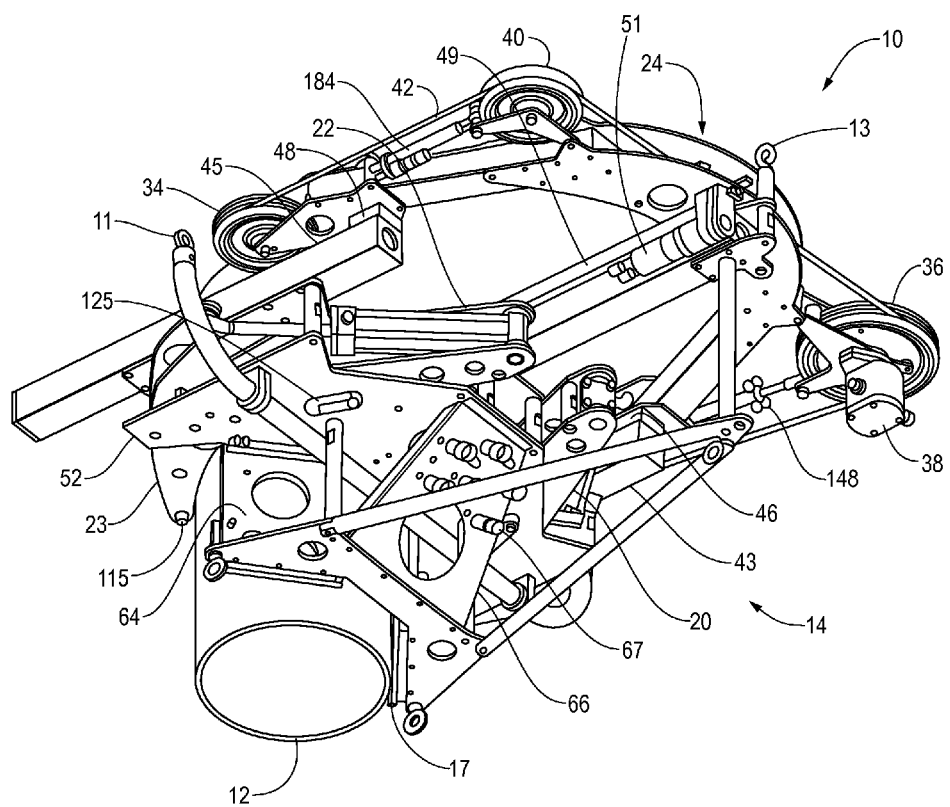
FIG. 5 is another isometric view showing the wire saw of FIG. 1 reconfigured to grasp a smaller diameter length of pipe.
Figure 6:
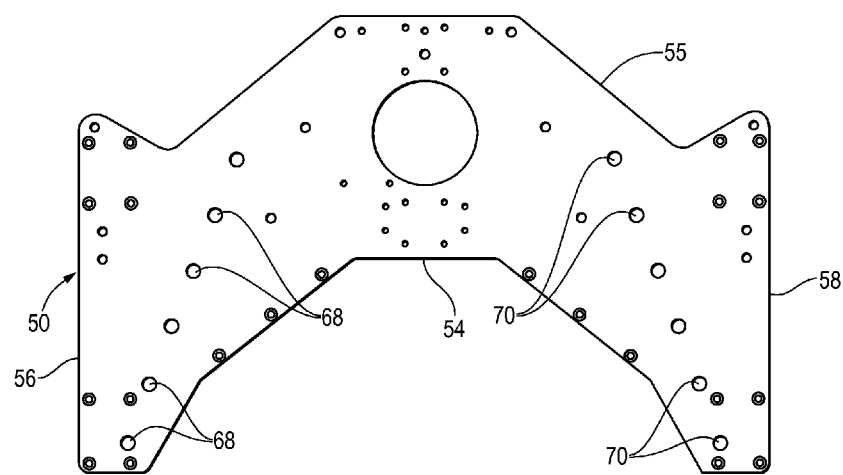
FIG. 6 is a front-end view of a frame plate from the wire saw shown in FIG. 1.

As best shown in FIGS. 2, 4, and 6, the central portion of the frame 14 is formed by a pair of identically shaped spaced apart plates 50, 52, each of which has a generally convex inner curve 54, the lower ends of which extend partially around the circumference of the length of pipe 12 to be cut. Opposite the inner curved side 54 and spaced several inches therefrom each plate 50, 52 has an outer concave curved side 55 and at each of the ends of the inner and outer sides 54, 55 are parallel outer edges 56, 58. The plates 50, 52 are maintained in parallel spaced relationship by a plurality of equal length spacer rods 60-60 retained by screws, not identified. Attached to the inner U-shaped sides 54 of both plates 50, 52 are a pair of transverse mounting plates 62, 64 the outer surfaces of which retain the pads 15, 16, 17, 18. An outer bracket 66 (best seen in FIGS. 1 and 5) extends between the outer surface of plate 52 and one end of the mounting plates 62, 64 and has mounted thereon connectors 67-67 for retaining hydraulic lines, not shown, for directing hydraulic fluid to the motor 38 and to other powered components of the machine 10. Each of the plates 50, 52 also includes two angularly oriented linearly arranged series of equally spaced transverse holes 68-68 and 70-70. Each series of holes 68-68, 70-70 has one end oriented near the center of the exterior curved side 55 and the other end near the neck formed between the interior curved side 54 and one of the outer edges 56, 58.

Figure 7:
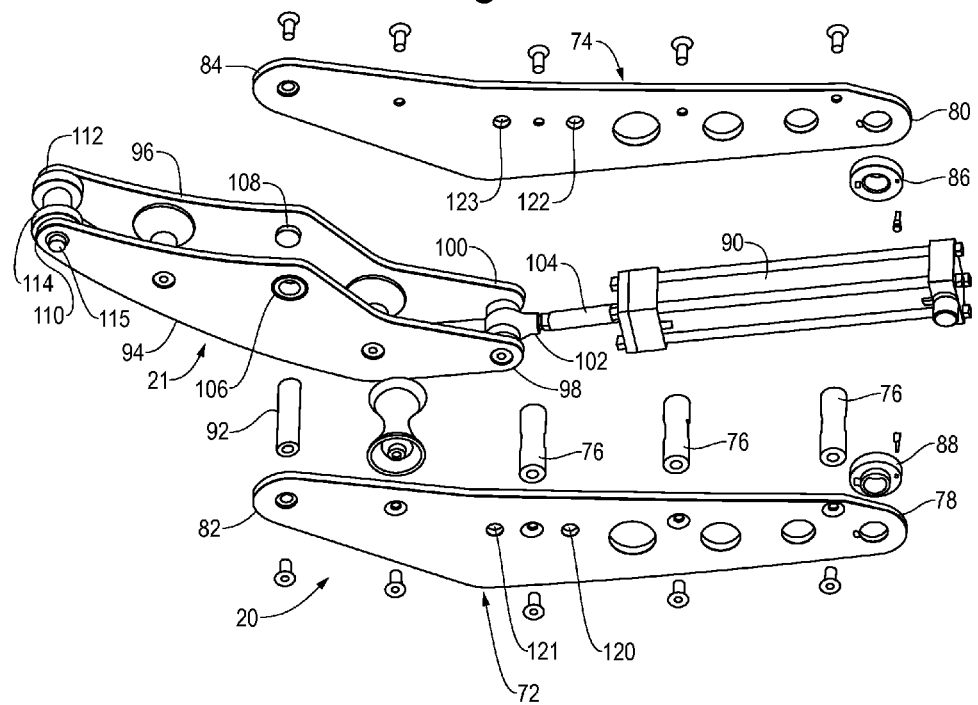
FIG. 7 is an exploded view of an arm assembly for the wire saw shown in FIG. 1.
Figure 8:
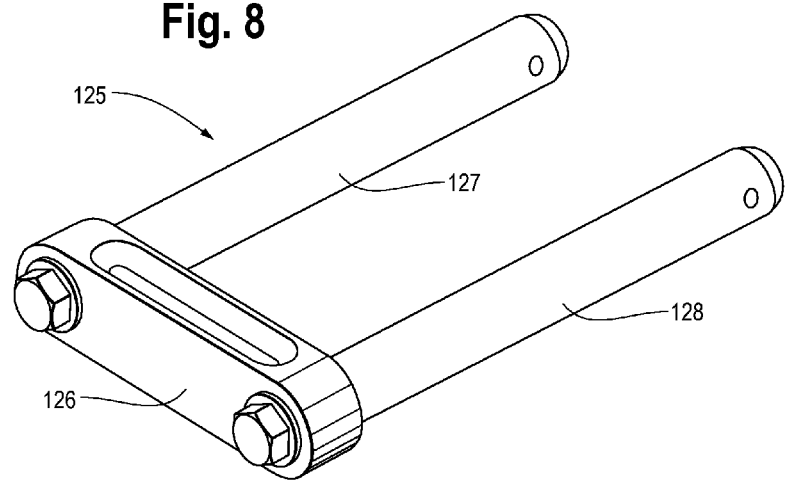
FIG. 8 is an isometric view of a pin fork for retaining the arm shown in FIG. 7 between the frame plates, one of which is shown in FIG. 6.

Referring to FIGS. 4 and 7, removably fitted between the plates 50, 52 near each of the outer edges 56, 58 are upper arms 20, 22 and moveable lower arms 21, 23, one set of which 20, 21 is depicted in FIG. 7 and is representative of both. Each of the upper arms 20, 22 is formed by a pair of side members 72, 74 which are retained in parallel spaced relationship by a plurality of spacer rods 76-76 with the distance between the outer edges of the side members 72, 74 being a little smaller than the distance between the inner surfaces of frame plates 50, 52 so as to fit therebetween. Each side member 72, 74 is generally elongate and has a first end 78, 80, and a second end 82, 84. Positioned between the first ends 78, 80 and retained by bushings 86, 88 is one end of a hydraulic cylinder 90. Midway along the length, each side member 72, 74 has a pair of spaced apart holes 120, 121 and 122, 123 therein with the distance between each pair of holes 120, 121 and 122, 123 being equal to the distance between any two sets of adjacent holes 68-68 and 70-70 in the frame members 50, 52. Positioned between the second ends 82, 84 of the side members 72, 74 and mounted on a pivot pin 92 is the moveable lower arm 21 formed by parallel lower arm members 94, 96.

The lower arm members 94, 96 are elongate in shape having first ends 98, 100 joined together by a pin that extends through a pivot eye 102 at the distal end of a piston rod 104 that is moveable by the cylinder 90. A pivot pin 92 retains the lower arm 21 to the upper arm 20 and extends through holes 106, 108 that are centrally located in each of the lower arm members 94, 96 such that extension of the piston rod 104 causes the second ends 110, 112 of the lower arm members 94, 96 to be urged towards the surface of a length of pipe fitted between the lower necks at the outer edges 56, 58 of the frame plates 50, 52. A roller 114 is rotatably retained by a pin 115 between the second ends 110, 112 such that the distal end of the lower arm members 94, 96 will roll against the surface of a pipe 12 as the arm members adjust around the surface thereof.

Figure 14:
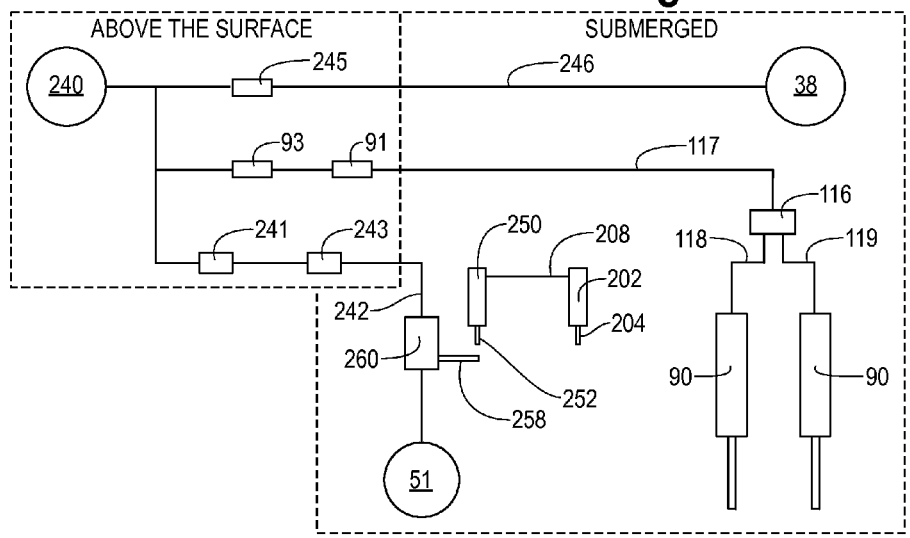
FIG. 14 is a schematic diagram of the hydraulic system for operating the wire saw of FIG. 1.

Referring to FIGS. 2, 7, and 14, an operator controls the machine 10 from a control panel, not shown, on the surface, and the control panel consists of control handles, not shown, for manually operable valves that direct hydraulic fluid from a source such as a pump 240 to the various motors 38, 51 and the cylinders 90. The operator's controls include a manually operable control valve 93 and a manually operable reversing valve 91 in line 117 to the cylinders 90 to operate the arms 21, 23. One aspect of the present invention is that a fluid flow divider 116 is provided after the operator's control valves 91, 93 in the hydraulic line 117, which equally divides the flow of hydraulic fluid through the lines 118, 119 that ultimately lead to the two cylinders 90. By equally dividing the flow of fluid to the two cylinders 90, the lower arms 21, 23 move in unison as they wrap around a length of pipe 12. Each of the cylinders 90 also has an operator controlled reversing valve 91 to enable an operator to release the arms 21, 23 from around a length of pipe 12. By moving the lower arms 21, 23 in unison the arms cooperate with each other as they move around a length of pipe and drawing it uniformly against the pads 15-18, thereby preventing the pipe from being skewed as it is grasped. Also, the rollers 114 at the second ends 110, 112 of each of the lower arms 21, 23 enable the lower arms to reposition with respect to the pipe with a minimum of friction.

Referring to FIGS. 1, 4, 5, 6, and 8, to retain each of the upper arms 20, 22 at its desired location along the outer edges 56, 58 of the frame plates 50, 52 a pair of pin forks 124, 125 are provided, one pin fork to retain each upper arm 20, 22. Each pin fork 124, 125 has a central body 126 with parallel transverse holes, unnumbered, near the ends thereof and a rod 127, 128 in each of the holes so as to be retained in parallel spaced relationship. To structure the frame 14 of the machine 10 to grasp the largest size pipe, as shown in FIG. 1, the rods 127, 128 of the pin forks 124, 125 are extended through the spaced holes 68-68 and 70-70 that are positioned nearest the necks of the outer edges 56, 58 and through aligned complementary spaced holes 120, 121, and 122, 123 of the upper arms 20, 22. To reconfigure the machine 10 to cut a much smaller diameter length of pipe as shown in FIG. 5, the holes 120, 121 and 122, 123 of the upper arms are aligned with the pair of holes 68-68 and 70-70 nearest the exterior curves 55 and the rods 127, 128 of the pins 124, 125 inserted therein. Accordingly, the machine 10 can be reconfigured to cut a wide variety of sizes of pipe 12 by merely repositioning the upper arms 20, 22 to allow the lower arms 21, 23 to grasp the desired diameter pipe and locking the upper arms 20, 23 in the desired orientation.

Figure 9:
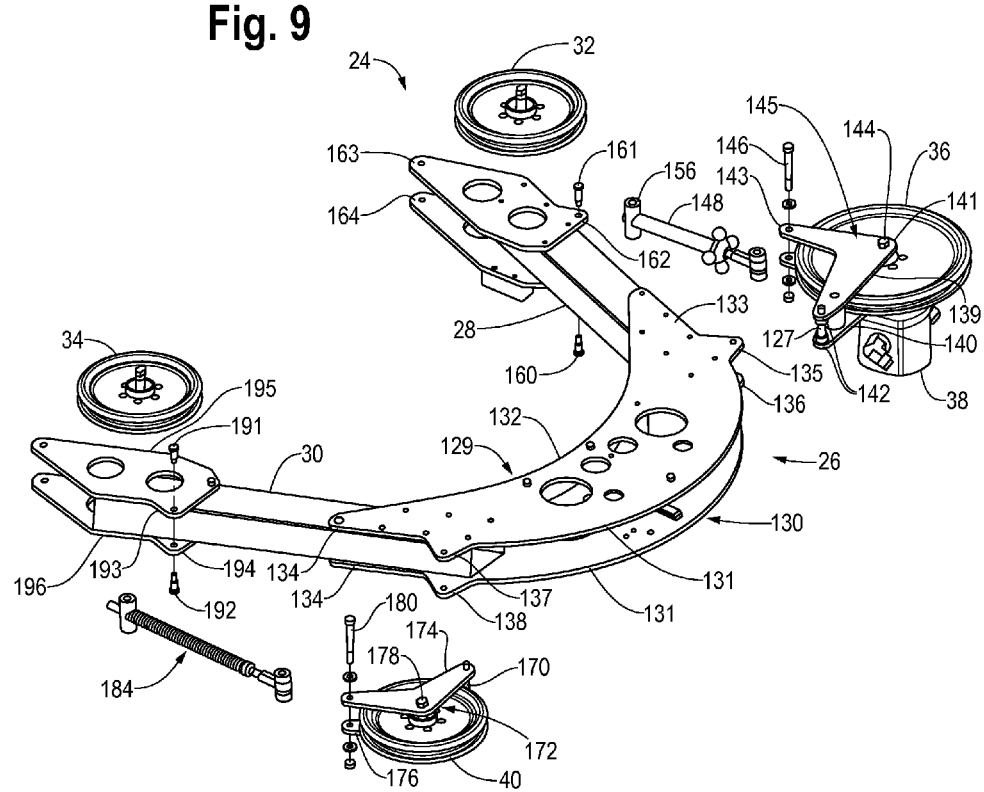
FIG. 9 is an exploded view of the bow that forms part of the wire saw shown in FIG. 1.

Referring to FIGS. 4 and 9, the central portion 26 of the bow 24 is formed by spaced apart parallel plates 129, 130, with each plate 129, 130 having generally arcuate outer and inner edges 131, 132 and first and second angled sides 133, 134. A pair of aligned ears 135, 136 are provided along the first sides 133 and a second pair of aligned ears 137, 138 are provided along the second sides 134. A pair of aligned holes, unnumbered, through the first pair of ears 135, 136 receive a pivot pin 127 for pivotally retaining a mounting 145 for the drive roller 36 and the motor 38.

The mounting 145 includes a pair of plates 139, 140 each of which generally defines a triangle with the corners 141, 142, 143 aligned with each other the drive motor 38 and drive roller 36 are mounted on a shaft 144 extending through holes in a first pair of aligned corners 141 and the pivot pin 127 extends through holes in a second pair of corners 142. One end of a pretensioning member 148 is pivotally attached by another pin 146 through the aligned holes, unnumbered, in the third corners 143 for adjusting the orientation of the mounting 138 around pin 127.

Figure 10:
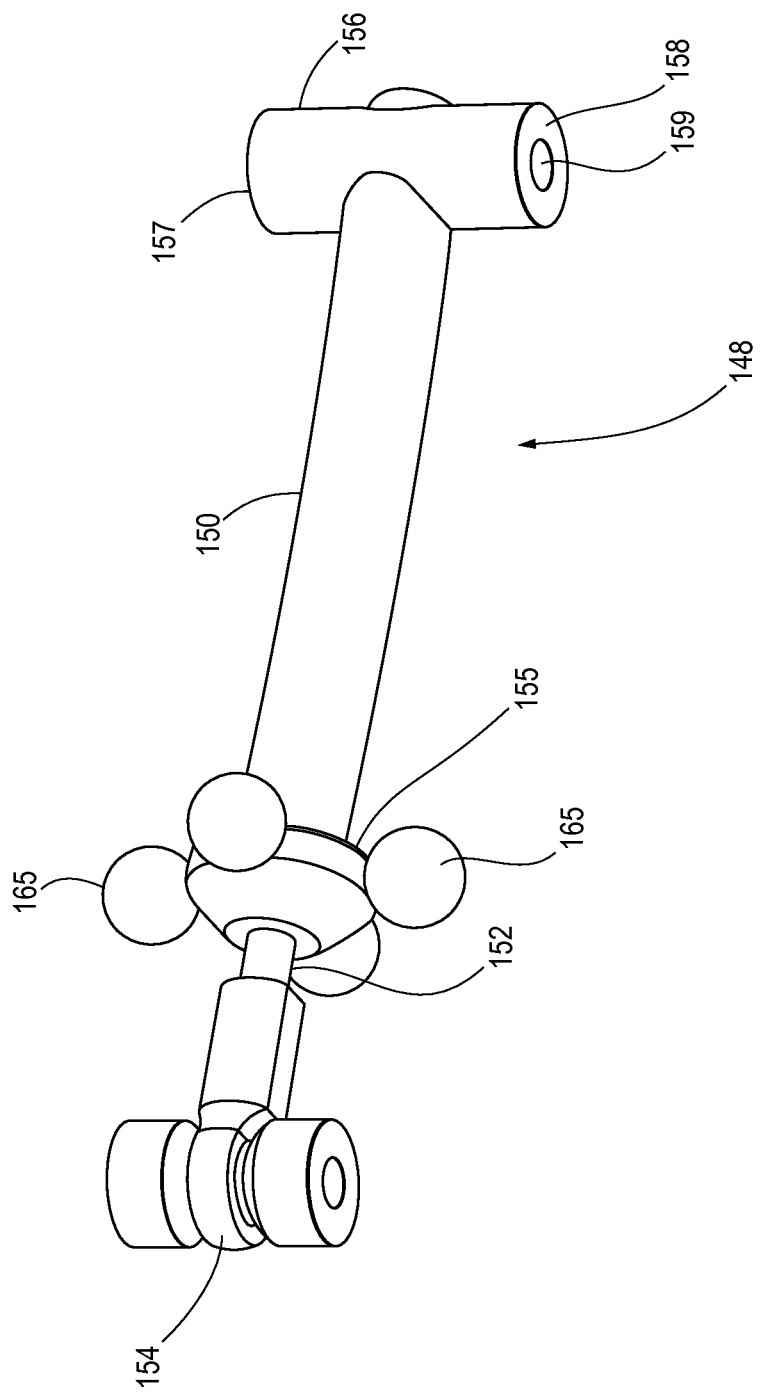
FIG. 10 is an isometric view of a pretensioner for the bow shown in FIG. 9.

Referring to FIGS. 9 and 10, the pretensioning member 148 includes a tubular body 150 that slideably receives one end of a threaded shaft 152. The opposite end of the threaded shaft 152 has an eye 154 connected thereto for pivotally receiving the pin 146 on the mounting 145. A nut 155 is threaded on the shaft 152 between the eye 154 and the tubular body 150. The second end of the tubular body 150 is attached to a mounting member 156 which is retained between parallel plates 163, 164, at the distal end of the first arm 28. The mounting member 156 has parallel spaced apart outer surfaces 157, 158 with threaded holes therein, one of which 159 is visible in FIG. 10. Each of the plates 163, 164, which also retain wheel 32 to the first arm 28, has an ear 162 with a hole therein. A mounting screw 160, 161 extends through the hole in each ear 162 and into the threaded hole 159 in each surface 157, 158 to retain the second end of the tubular body 150. Accordingly, rotation of the nut 155 will urge the threaded shaft 152 longitudinally outward of the tubular body 150 and thereby apply tension to the diamond cutting wire 42 that extends around the wheels 32, 34, 36, 42. A plurality of knobs 165-165 positioned on posts, unnumbered, around the circumference of the nut 155 enable the nut to be manually rotated to apply the desired tension to the wire 42.

Referring to FIGS. 4, 9, 10 and 11, extending through aligned holes in the second pair of ears 137,138 at the opposite side of the central portion 26 is a pin 170 which rotatably receives a second retainer 172 for retaining the take-up roller 40. The second retainer 172 consists of a pair of parallel plates 174, 176, each of which generally bears the shape of a boomerang with the take-up roller 40 mounted on a shaft 178 positioned at the bend near the center of the boomerangs. The pin 170 extends through a pair of aligned holes at one end of the plates 174, 176, for pivotally mounting the retainer 172 and the take-up roller 40 to the bow 24. The opposite ends of the boomerang-shaped plates 174, 176 have a second pair of aligned holes, unnumbered, which receive another pin 180 for rotatably receiving one end of a spring loaded wire tensioner 184.

Figure 11:
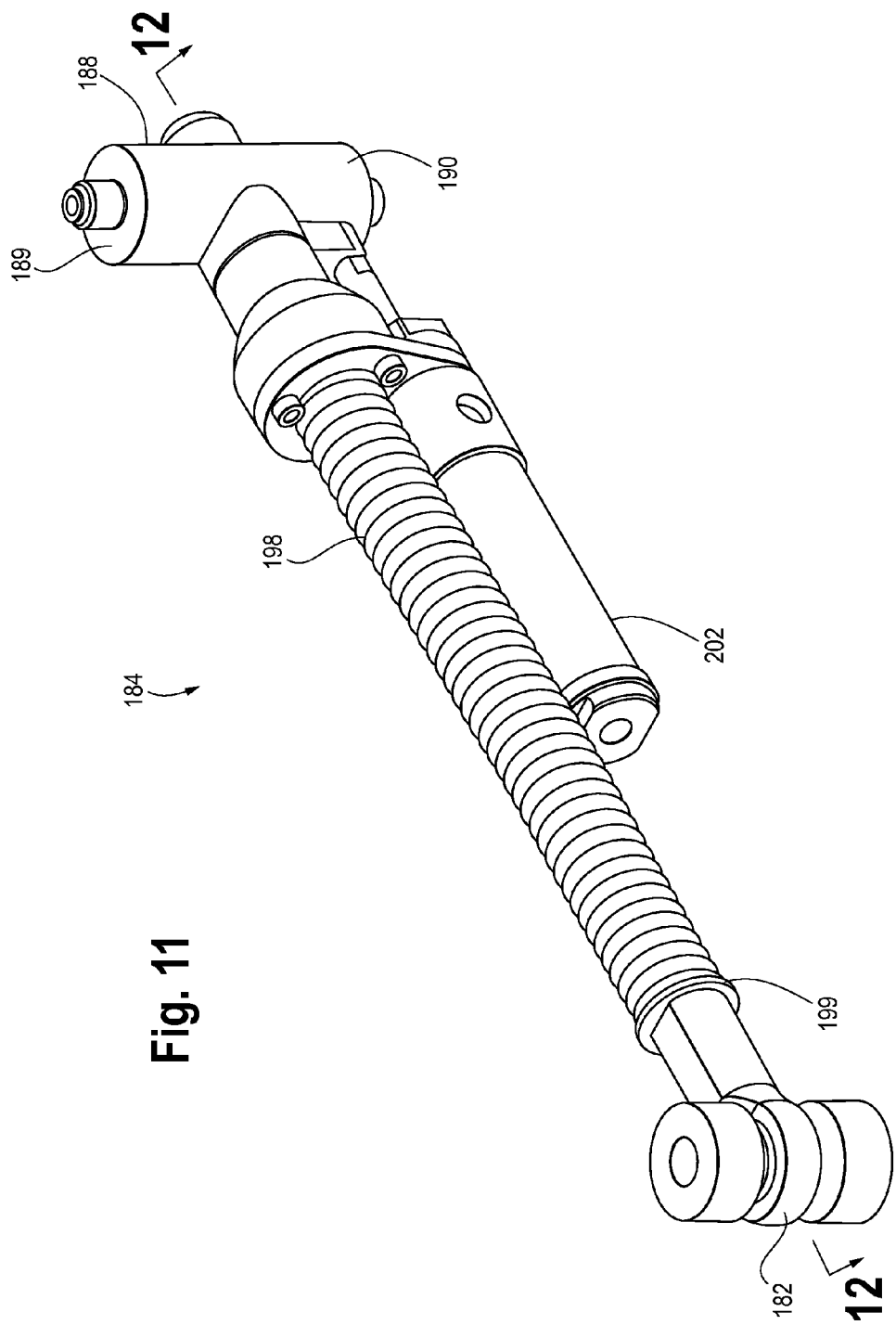
FIG. 11 is an isometric view of a wire tensioner and sender piston for the bow shown in FIG. 9.
Figure 12:
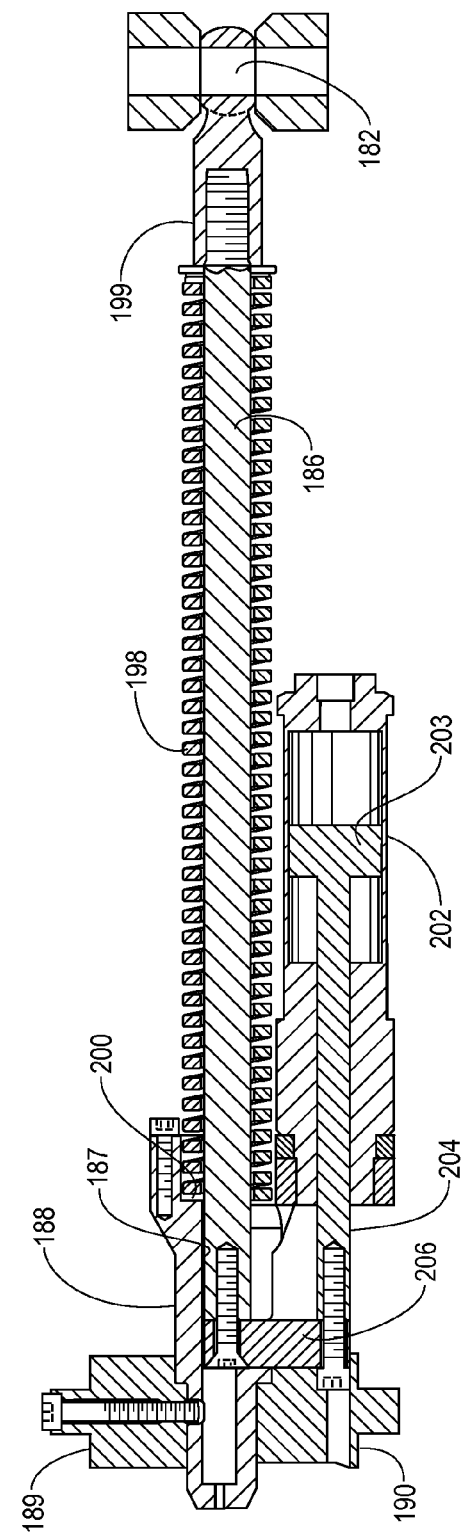
FIG. 12 is a cross-sectional view of the tensioner and sender piston shown in FIG. 11.
Figure 13:
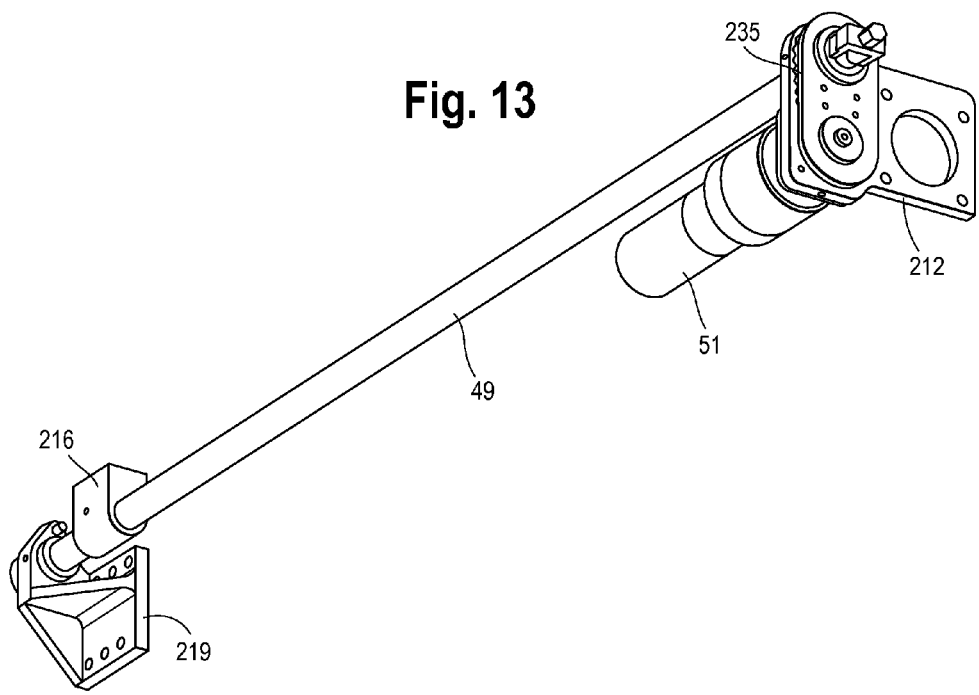
FIG. 13 is an isometric view of a feed assembly for moving the bow shown in FIG. 9 with respect to the frame of the wire saw shown in FIG. 1.
Figure 13A:
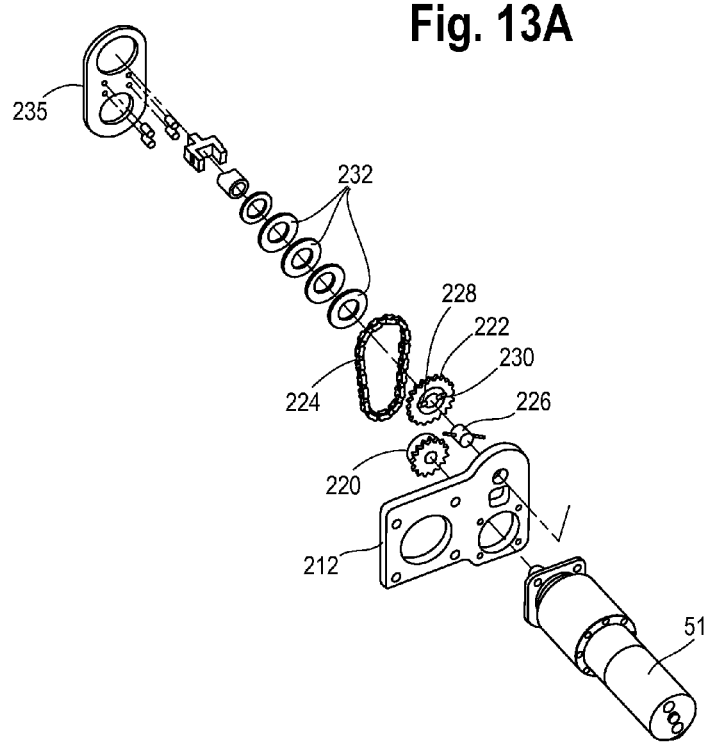
FIG. 13A is a fragmentary exploded view of the feed assembly shown in FIG. 13.

Referring to FIGS. 9, 11 and 12, the wire tensioner 184 includes an elongate shaft 186 is inserted into the end of an elongate retainer 199 having the eye 182 for receiving the pin 180. The opposite end of the shaft 186 is slideably received in a transverse hole 187 that extends longitudinally through a second retainer 188. The distal end of the second retainer 188 has parallel spaced apart outer surfaces 189, 190 each having a threaded hole therein for receiving screws 191, 192. The screws 191, 192 also extend through aligned holes in a pair of ears 193, 194 in parallel plates 195, 196 positioned at the outer end of the second arm 30 to retain the second end of the shaft 186 thereto. Extending around the circumference of the shaft 186 is a compression spring 198 that is compressed between the retainer 199 near the eye 182 and an annular surface 200 on the retainer 188 by the tension in the wire 42. The spring 198 is therefore compressed as the shaft 186 is urged deeper into the transverse hole 187. Accordingly, rotating the nut 155 on the pretensioning member 148 increases the tension in the wire 42 and compresses the spring 198 causing the distal end of the shaft 186 to move further into the hole 187 in the retainer 188.

As best shown in FIGS. 11, 12 and 14, mounted parallel to the distal end of the shaft 186 is a hydraulic cylinder 202. Within the cylinder 202 is a piston, 203, having a shaft 204 at the end of which is a connector member 206. The connector member 206 joins the shaft 204 to the free end of shaft 186 that extends out through the second retainer 188. The piston 203 therefore moves with the shaft 186 as tension in the wire 42 changes and as the bending of the wire 42 changes. The cylinder 202 is connected by a pair of hydraulic lines, jointly identified by indicia number 208, with the hydraulics configured to move the piston and associated piston shaft 252 of cylinder 250 in unison with the movement of piston 203 and shaft 204 of cylinder 202.

Figure 16:
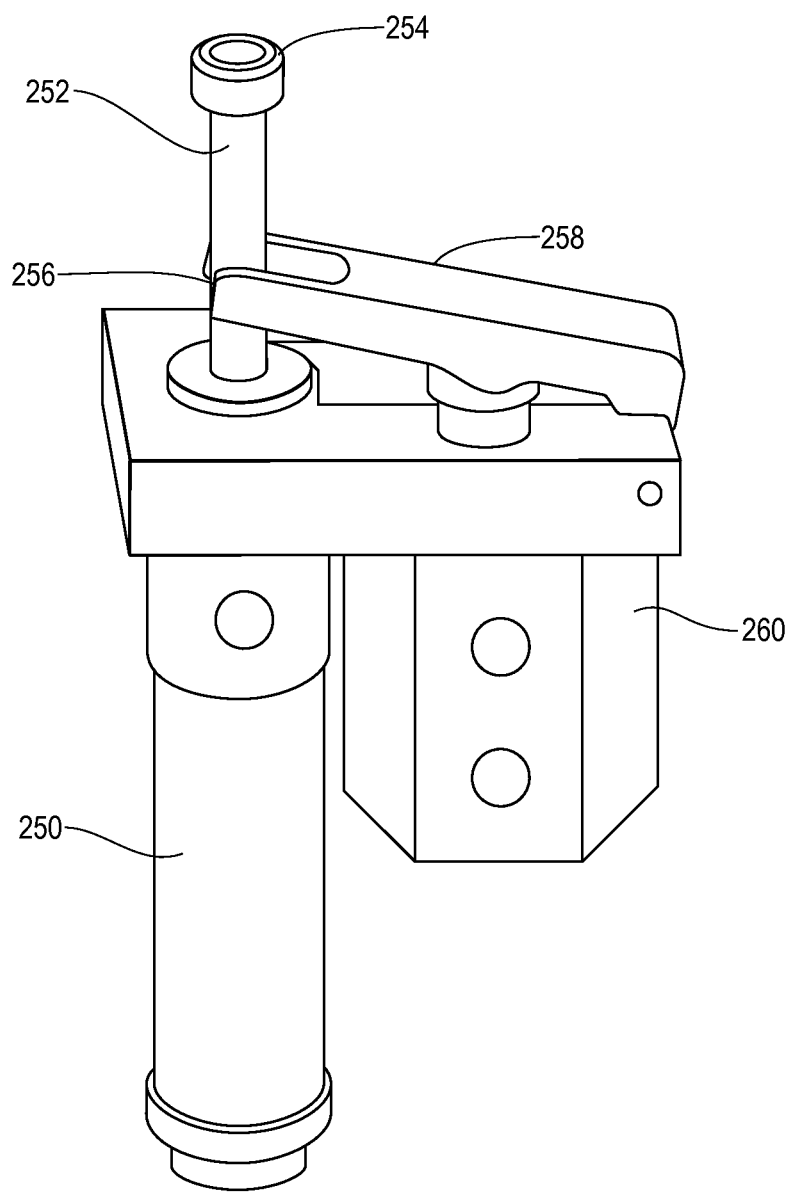
FIG. 16 is a receiver piston and shut off valve that respond to the sender piston shown in FIGS. 11 and 12.

Referring to FIGS. 14 and 16, the rod 252 has an enlarged end 254 sized to engage the prongs of a fork 256 at the end of a lever arm 258 when the rod 252 is drawn into the cylinder 250 and approaches the end of its travel. Compression of the lever arm 258 activates a hydraulic shut off valve 260 that stops the flow of hydraulic fluid to motor 51 that turns the feed screw 49. The piston rod 252 therefore moves responsive to changes in the tension in wire 42, and the enlarged head 254 is adapted to engage the fork 256 and close the shut off valve 260 when the wire 42 bends more than desired, as is further described below.

Referring to FIGS. 1, 4, 13 and 13A, the feed screw 49 has one end rotatably mounted in a plate 212 retained at the upper end of the center track 44 of the frame 14 and the opposite end rotatably mounted in a mounting block 219 adjacent the lower end of the center track 44. A feed nut 216 threadedly receives the feed screw 49 and is secured by bolts, not shown, to plate 52 of the center portion 26 of the bow 24 such that rotation of the feed screw 49 causes longitudinal movement of the bow 24 along the tracks 43, 44, 45.

The hydraulic motor 51 is also mounted on the upper plate 212 and is drivingly connected through first and second sprockets 220, 222 and a chain 224 to the feed screw 49. The second sprocket 222 engages the feed screw 49 through an overload release clutch in the form of a pin 226 that extends transversely through the end of the shaft of motor 51 with the outer ends of the pin 226 engaging radially outwardly extending grooves 228, 230 in the second sprocket 222. The pin 226 is forced into the grooves 228, 230 by means of a plurality of compressible washers 232-232. The sprockets 220, 222 and washers 232-232 are retained in assembled relationship by an outer end plate 235. Accordingly, if the load on the feed screw 49 becomes excessive, the pin 226 will disengage from the grooves 228, 230 and allow the second sprocket 222 to rotate while the feed screw 49 remains stationary.

Referring to FIG. 14, hydraulic fluid flows in only one direction; however it should be appreciated that for every outwardly directed flow line a corresponding return line is also provided. The lines are not shown in pairs, but rather a single line is provided to show the hydraulic connection that includes flow lines in both directions. A control valve 241, manually operable from the surface, directs fluid from the pump 240 through line 242 through the shut off valve 260 and then to the motor 51. Shutoff valve 260 is operated by cylinder 250 and cylinder 202, with cylinder 202 controlled by the spring loaded tensioner 184. Tension in the wire 42, that exceeds a preset threshold, as detected by the spring loaded tensioner 184, will therefore terminate the flow of hydraulic fluid to the motor 51 causing it to stop. A reversing valve 243, which is also manually operable from the surface, is positioned along line 242 and before the shut off valve 260 and enables an operator to reverse the direction of the motor 51 to withdraw the bow 24 after a cut has been made. The motor 38 that drives the cutting wire 42 is controlled by a separate valve 245 in a dedicated supply line 246 and valve 245 is manually operable from the surface.

As shown in FIG. 9, the drive wheel 36 applies force from the motor 38 to the wire 42 to rotate it around the various guide wheels 32, 34, 40. In order to apply sufficient force to the wire 42 to cut the steel pipe there must be a sufficiently high coefficient of friction between the contact surface of the drive wheel 36 and the cutting wire 42. To provide such a high coefficient of friction, existing wire cutting machines have an elongate strip of rubber inserted into the annular groove in the outer circumference of the drive wheel. The rubber strip is compressible and provides the desired friction to drive the wire 42. The rubber from which such strips are formed is not sufficient elastic to be configured as a three hundred and sixty degree loop that can be expanded and snapped over the circumference of the drive wheel. Instead, the contact material is formed by cutting an elongate ribbon of material to the desired length and wrapping the length of ribbon within the groove of the drive wheel with the ends of the ribbon positioned in close proximity to each other. Since the material of which the elongate ribbon is formed has a relatively high degree of flexibility, it is subject to wear and must frequently be replaced. Existing ribbons of contact material are replaced by first ripping out the worn ribbon after which a new length of ribbon is cut to the desired length and bonded into place. One problem with such elongate ribbons of friction material is that the material deteriorates most rapidly at the junction of the two ends of the length of ribbon.

Figure 22:
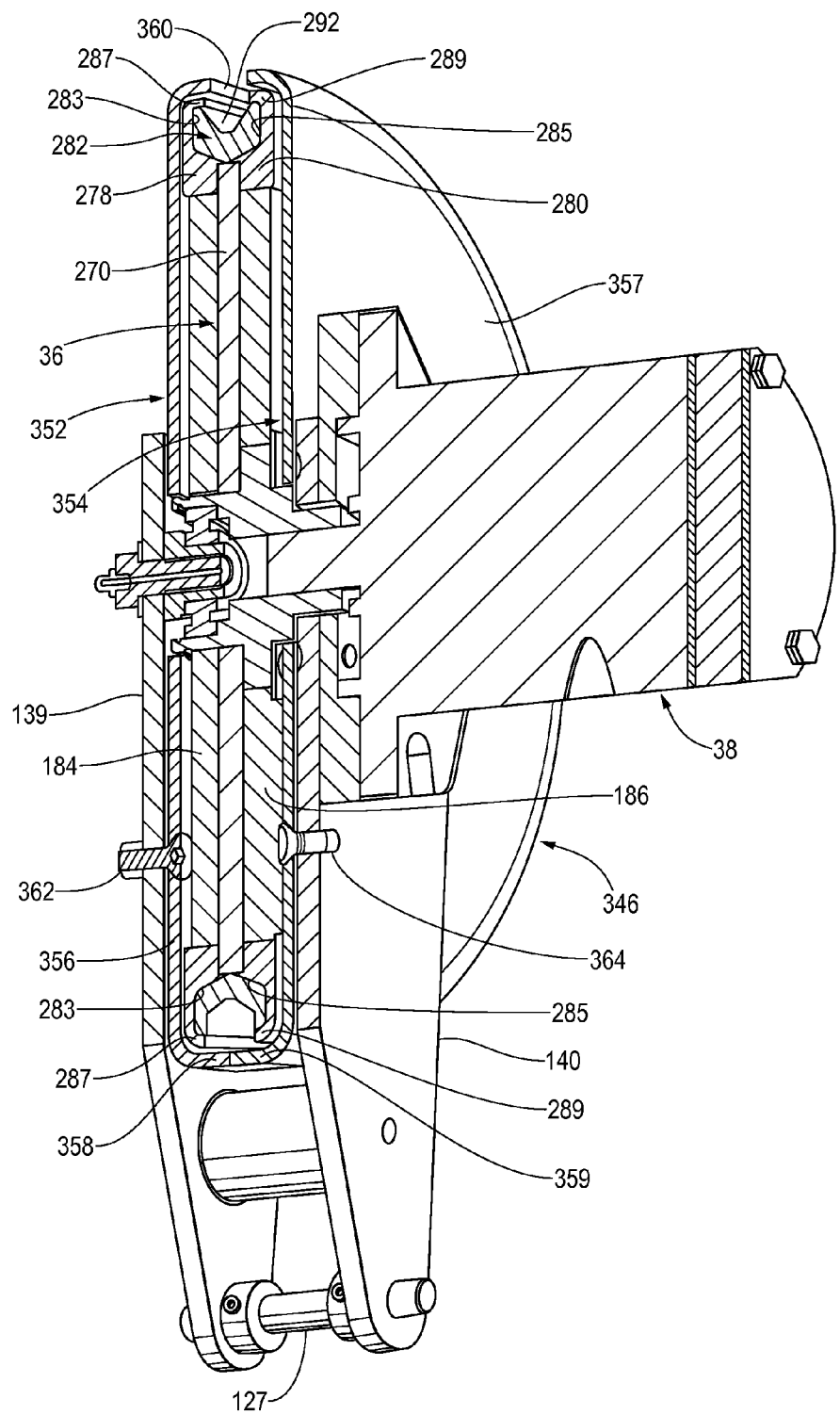
FIG. 22 is a cross-sectional, isometric view of the drive wheel and cover shown FIG. 21.
Figure 23:
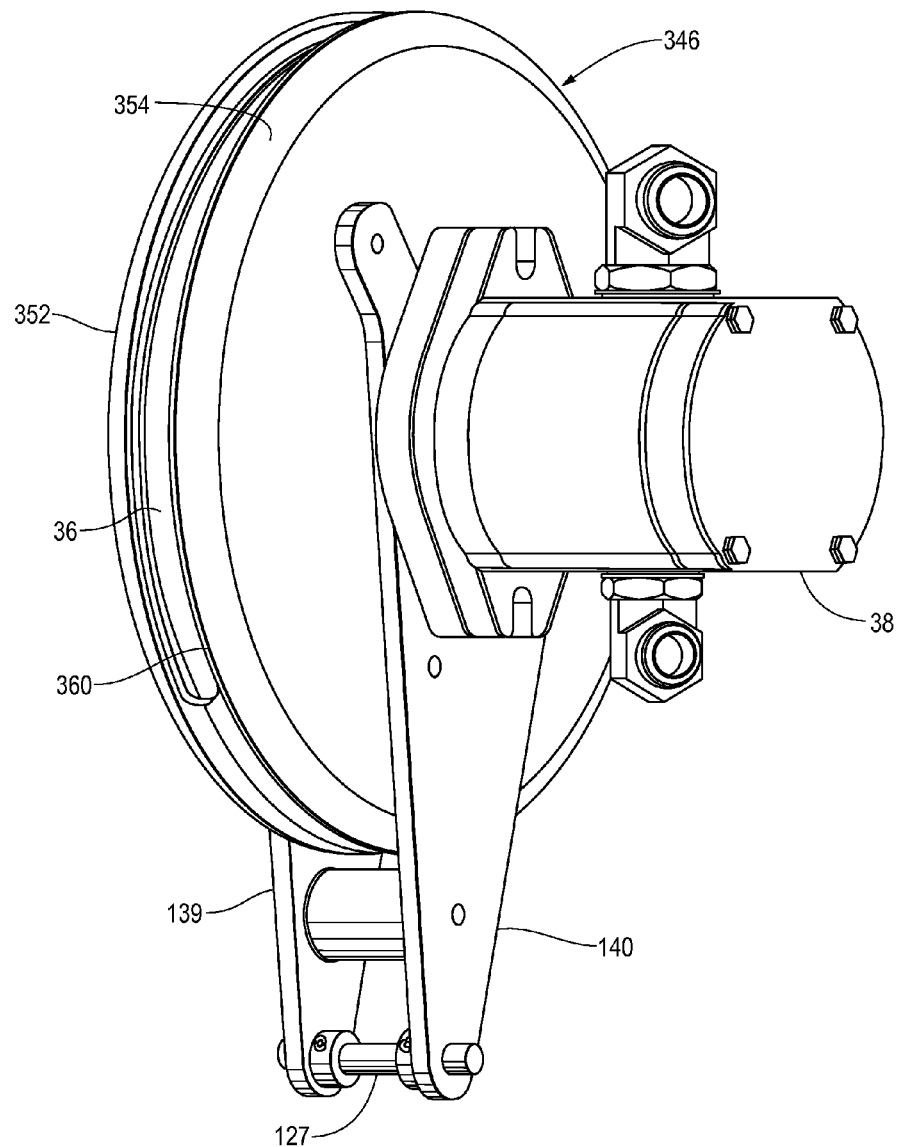
FIG. 23 is an isometric view of the wheel cover and wheel shown in FIG. 22.

Referring to FIGS. 17, 18, and 22, the drive wheel 36 of the present invention has a disc-shaped central body 270, preferably made of aluminum, with a circular outer circumference and a circular central opening 274. A plurality of holes 276-276 are equally spaced around the central opening 274 for receiving screws, not shown, for attaching the drive wheel 36 to the shaft 144 (visible in FIG. 9) of the drive motor 38 to thereby apply rotational force to the drive wheel 36. Positioned on opposite sides of the central body 270 are first and second annular outer rings 278, 280 retained to the circumference of the central body 270 by removable screws 288-288 and 290-290 respectively. Fitted within the central openings of the outer rings 278- 280 and against opposite surfaces of the central body 270 are plastic annular spacers 284, 286. The outer circumference of the rings 278, 280 is larger than the outer circumference of the central body 270 and each of the rings 278, 280 has an annular groove 283, 285 that is directed toward the other forming opposing outer lips 287, 289. Accordingly, when the parts are assembled together, the outer lips of the two rings 278, 280 are spaced apart and the grooves 283, 285 combine to form a single annular groove around the outer circumference of the assembled parts, a portion of the floor of which is the outer circumference of the central body 270. An annular urethane insert 282 has an inner diameter sized to fit into the groove formed by the outer diameter of the central body 270 and the grooves 283, 285. In the preferred embodiment, the outer circumference of the insert 282 has an annular groove 292 therein into which the diamond cutting wire 42 is received. The annular urethane insert 282 has sufficient resilience to provide the high coefficient of friction needed to apply adequate force to the diamond cutting wire 42 to cut into the steel of the pipe 12.

As can be seen in FIG. 18, when the parts of the drive wheel 36 are assembled together, the side surfaces of the drive wheel 36 are substantially planar, interrupted only by various transverse holes that are occupied by the heads of threaded screws and a relatively small annular ridge 294 that defines the inner circumference of the outer rings 278, 280.

The annular insert 282 can also be easily replaced by first removing the retaining screws 288-288 of one of the rings 278. Once ring 278 has been removed, the worn insert 282 can be removed and the replacement installed without stretching the insert 282. After the insert 282 has been replaced, the ring 278 is reassembled and the retaining screws 288-288 inserted to retain wheel 36 together. In the preferred embodiment, the central body 270 of the wheel 36 and the second ring 280 remain mounted on the shaft 144 while the outer ring 278 is removed and the inset 282 is replaced, such that the insert 282 can be replaced in the field without disassembling the bow 24.

Referring to FIGS. 19 and 20, the guide wheels 32, 34, 40 are formed in a fashion similar to the drive wheel 36 and guide wheel 32 is representative of all three guide wheels 32, 34, 40. The guide wheel 32 includes an annular central body 310 made of aluminum or other suitable material. Secured to one side of the central body 310 by a first plurality of screws 333-333 is a first end plate 338 and secured to the opposite side of the central body 310 by a second plurality of screws 335-335 is a second end plate 340, each of which has a central opening sized to receive one end of an annular hub 316. Extending through the hub 316 is a non-rotatable shaft 322 upon which the hub 316 is supported by bearings 318, 320. The parts are maintained in assembled relationship on the axle 322 by a plurality of retainers 324, 326, 328 and by outer retainer rings 330, 332 to thereby permit rotation of the wheel 32 about the axle 322. The inner cavity of the central body 310 is filled with a lightweight annular plastic filler 312.

Fitted around the outer circumference of the second central body 310 is another annular urethane replaceable insert 334 having an annular groove 336 around the outer circumference thereof. The replaceable urethane inserts 334 useable with the guide wheels 32, 34, 40 are made of a harder urethane compound than the material of which the insert 282 of drive wheel 36 is made and therefore has a longer useable life. Like the drive wheel 36, the insert 282 around each of the remaining wheels 32, 34 can be replaced by first removing the screws 333-333 and one end plate 338 while the remaining portions of the wheel 32 remains on the bow 24.

Figure 21:
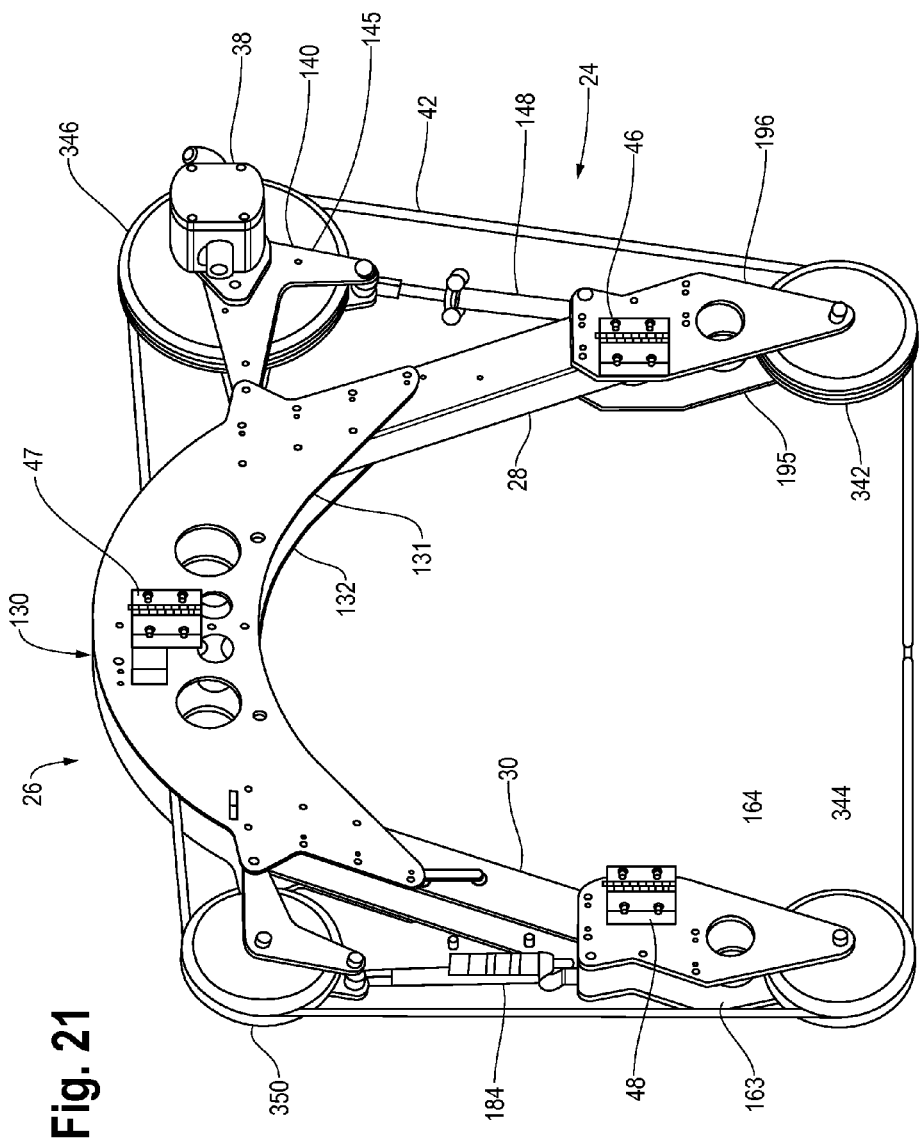
FIG. 21 is an isometric view of the bow shown in FIG. 9 with the wheels enclosed in wheel covers.

Referring to FIGS. 9, 21, 22, and 23, in another embodiment of the invention, each of the various wheels 32, 34, 36, 40 that retain the cutting wire 42 are enclosed in a non-rotating enclosure with each enclosure having an arcuate slot therein through which the wire 42 passes to wrap around the wheel therein. As shown in FIG. 21, wheel 32 is within enclosure 342, wheel 34 is within enclosure 344, wheel 36 is within enclosure 346, and wheel 40 is within enclosure 350.

As shown in FIG. 22, in which wheel 36 and enclosure 346 are representative of all, enclosure 346 is formed as a clam shell with a first half 352 and an opposing mirror image second half 354. As can be seen, the first and second halves 352, 354 have planar portions 356, 357 that extend parallel to the adjacent surfaces of the body of the wheel 36 and an inwardly directed outer lip 358, 359 that wraps around the outer circumference of the wheel 36. The outer lips 358, 359 meet each other for a portion of the circumference of the enclosure but leave a gap forming a slot 360 that extends around the portion of the wheel 36 that receives the wire 42. The first half 352 is retained by screws 362 to plate 139 and the second half 354 is retained by screws 364 to plate 140 where plates 139 and 140 form retainer 145.

When the first and second halves 352, 354 are assembled to form the enclosure 346, the enclosure 346 will completely surround the rotating wheel 36 thereby preventing the rotating wheel 36 from applying rotational force to the surrounding water. The diamond cutting wire 42 extends through the slot 360 to reach the groove 292 in the insert 282.

Referring generally to all the figures, to operate the wire cutting machine 10, the pretensioning member 148 is adjusted to apply sufficient tension to the diamond embedded wire 42 to incrementally compress the spring 198 of the spring loaded tensioner 184. The cylinders 90 are operated to wrap the lower arms 21, 23 around a length of pipe 12 to retain it against the pads 15-18. Power is applied from the source 240 through the hydraulic lines 242 to operate the motor 38 to rotate the drive wheel 36 to thereby drive the diamond embedded wire 42. Simultaneously, hydraulic fluid is supplied through line 244 to the hydraulic motor 51 to operate the feed screw 49 causing the bow 24 to move along the tracks 43, 44, 45 until the portion of the wire 42 extending between the wheels 32, 34 engages the surface of the pipe 12. As the feed screw 49 continues to rotate, the bow 24 is moved further along the tracks 43, 44, 45 and the wire 42 begins cutting into the surface of the pipe 12. Further movement of the bow 24 along the tracks 43, 44, 45 causes the wire 42 to bend around the pipe 12 as it continues to cut. As the wire bends, the spring 198 of the spring loaded tensioner 184 is further compressed until movement of the shaft 186 causes the piston rod head 254 to engage the fork 256. Further bending of the wire 42 will then cause the cylinder 250 to operate the shut-off valve 260 thereby terminating the flow of hydraulic fluid to the motor 51 and stopping the feed screw 49. The motor 38 that drives the diamond wire 42 will continue to operate and the wire 42 will continue to cut the pipe 12 until it cuts sufficiently through the pipe 12 to reduce the bending in the wire between the wheels 32 and 34. As the bend of the wire between the wheels 32 and 34 is reduced, the spring 198 will take-up the wire 42 until movement of the shaft 186 causes cylinder 250 to reopen the shut-off valve 260 allowing hydraulic fluid to again flow to the motor 51. As the motor 51 begins operating, it will again rotate the feed screw 49 and advance the bow 24 further along the tracks 43, 44, 45 and causing the length of wire between wheels 32 and 34 to again bend further around the pipe 12 as the wire continues to cut the pipe. In this fashion, the rate at which the feed screw 49 drives the bow 24 and advances the wheels 32, 34 is dependent upon the bending of the wire 42 between the wheels 32 and 34. The feed screw 49 and motor 51 stop movement of the bow 24 when the bending becomes excessive and advance the bow 24 as the spring 198 takes up excess wire 42. By linking the drive rate of the feed screw 49 to the bending of the wire 42 it is not necessary to provide a serpentine-type wire take-up to prevent the application of excessive forces to the wire 42.

All the wheels 32, 34, 36, 40 that retain the diamond cutting wire 42 rotate on parallel axes and are positioned to retain the wire 42 in one plane. This is not possible where a serpentine-type take-up is needed to prevent excess forces within the wire. One benefit of maintaining the wire 42 within a single plane is that the wire 42 is not twisted as it operates. Twisting of the wire generates forces perpendicular to the direction of motion of the wire and such forces must be accommodated to prevent mechanical failure of the wire.

Referring to FIGS. 9, 17, 21, and 22, to replace the urethane insert 282 of the drive wheel 36, an operator will remove plate 139 to obtain access to the outer ring 278. The retaining screws 288-288 and the outer ring 278 are then removed, after which the worn annular insert 282 is replaced with a new one. Thereafter, the parts and retaining screws are reassembled without removing the drive wheel 36 from the shaft 144. Accordingly, the annular insert 282 is easily replaced by an operator in the field. Furthermore, since the insert 282 is continuous through three hundred and sixty degrees, it does not have a pair of adjoining ends which are subject to deterioration requiring the premature replacement of the contact material needed to drive the cutting wire 42.

The wire cutting machine 10 is preferably made of aluminum or stainless steel with the parts assembled together by bolts and the like so as to avoid welding or other processes which are subject to deterioration as a result of being submerged in salt water. By providing that the machine 10 is made in modular parts that include the frame 14, the bow 24, and the arm assemblies 20, 21 and 22, 23, the parts can be replaced for parts of different sizes as needed, and the parts reassembled in different orientations to fit different sizes of pipe 12. The modular parts also facilitate the transportation of the machine to a work site where it can be easily assembly.

Figure 15:
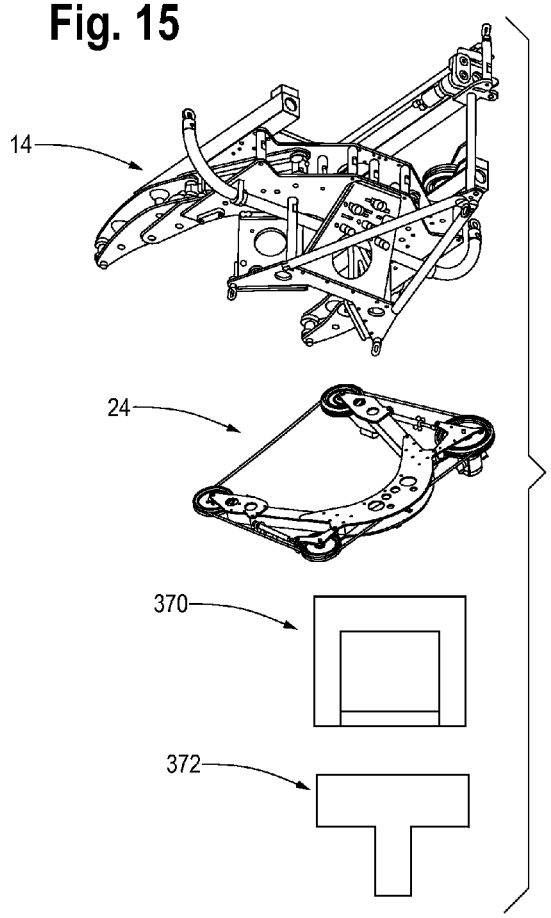
FIG. 15 is a schematic summary of modular parts including those needed to form the wire saw shown in FIG. 1.

Referring to FIG. 15, another advantage of modular parts is that the machine can be modified to perform other functions. For example, a machine owner may purchase optional parts such as a guillotine saw 370 that has track followers, not shown, positioned to engage the tracks 43, 44, 45 on the frame 14. The owner might also purchase a drill assembly 372 with similarly configured track followers such that the frame 14 and arms 20, 22 can receive the bow 24 mounted wire saw, the guillotine saw 370 or the drill 372. The modular parts therefore permit an operator to assemble the machine to perform any of a number of functions.

While many specific aspects of the present invention have been described, it will be appreciated that many more modifications and variations may be made without departing from the spirit and scope of the invention. It is therefore the intent of the appended claims to cover all such modifications and variations which fall within the spirit and scope of the invention.

What is claimed:

1. A device for cutting a length of pipe comprising:
a clamp portion, said clamp portion including a plurality of pads for contacting a surface of said pipe, said clamp portion extending around said pipe and retaining said pipe against said plurality of pads,
a bow moveable with respect to said clamp portion, said bow having a pair of arms with spaced apart outer ends for extending around said pipe,
a wheel on each of said outer ends,
a cutting wire loop on said wheels,
a motor on said bow for rotating said cutting wire loop around said wheels,
a take-up wheel on said bow and engaging said cutting wire loop, said take-up wheel applying a tension along said wire,
a feed drive connected between said clamp portion and said bow for moving said bow relative to said clamp portion to thereby urge said cutting wire against said pipe,
a detector for detecting a bending of said cutting wire between said outer ends,
a control responding to said detector, and connected to said feed drive wherein a feed rate is varied with cutting wire bending,
wherein said clamp portion includes a first and a second moveable arm for extending around said pipe and retaining said pipe against said plurality of pads, said first arm driven by a first motor and said second arm driven by a second motor,
a mechanical synchronization between said first motor and said second motor wherein said first arm and said second arm move in unison to encircle said length of pipe,
an enclosure surrounding one of said wheels, said enclosure having a slot therein adjacent a portion of said wheel wherein said cutting wire extends through said slot to an outer surface of said one of said wheels wherein rotational force is not applied to water surrounding said wheel enclosure;
a frame,
said clamp portion mounted on said frame, one of said first and second moveable arms including an upper arm portion and a lower arm portion moveable with respect to said upper arm portion, and
a cylinder between said upper arm portion and said lower arm portion for moving said lower arm portion with respect to said upper arm portion, and
said frame having a plurality of mounting locations located thereon for receiving said one of said moveable arms at any one of said plurality of mounting locations wherein said one of said moveable arms will grasp a range of sizes of pipe at each of said mounting locations that is different from a range of sizes of pipe that can be grasped at any other of said plurality of mounting locations.

2. The device of claim 1 wherein said bow further comprises a drive wheel connected to said motor for driving said cutting wire loop, and said drive wheel, said take-up wheel, and said wheels on each end of said outer ends retaining said wire in one plane wherein said wire is always moveable in said plane.

3. The device of claim 1 wherein said clamp portion includes at least one moveable arm extending around a diameter of said pipe and a roller on a distal end of said arm for rolling on a surface of said length of pipe.

4. The device of claim 1 wherein said one of said wheels has first and second spaced apart large diameter side walls and a smaller diameter annular floor between said side walls, said one of said wheels further having a first wheel portion including said first large diameter side wall and said annular floor, said first wheel portion attached to a shaft on said device, said one of said wheels also having a second wheel portion including said second larger diameter side wall, said second wheel portion attachable to said first wheel portion by one or more removable fasteners, and an annular insert between said spaced apart side walls and around said annular floor wherein said annular insert is replaceable by removing said plurality of removable fasteners and removing said second wheel portion without removing said first wheel portion from said shaft.

5. A device for working a length of pipe comprising:

a clamp portion, said clamp portion including a plurality of pads for contacting a surface of said pipe, said clamp portion also including a first and a second moveable arm for extending around said pipe and retaining said pipe against said plurality of pads, said first moveable arm driven by a first motor and said second moveable arm driven by said second motor, a mechanical synchronization between said first motor and said second motor wherein said first moveable arm and said second moveable arm move in unison to encircle said length of pipe, a machining portion linearly moveable with respect to said clamp portion, said machining portion for working said length of pipe, a feed drive connected between said clamp portion and said machining portion moving said machining portion relative to said clamp portion to thereby urge said machining portion against said pipe, wherein said first and second motors are hydraulic cylinders, a frame, said clamp portion mounted on said frame, said frame having a plurality of mounting locations located thereon for receiving one of said moveable arms at any one of said plurality of mounting locations wherein said one of said moveable arms will grasp a range of sizes of pipe at each of said mounting locations that is different from a range of sizes of pipe that can be grasped at any other of said plurality of mounting locations, said machining portion is a wire saw with a bow having a pair of bow arms with spaced apart outer ends for extending around a diameter of said pipe, a wheel on each of said outer ends, a cutting wire loop on said wheels, a motor on said bow for rotating said cutting wire loop around said wheels, a take-up wheel on said bow and engaging said cutting wire loop, a feed drive connected between said clamp portion and said bow for moving said bow relative to said clamp position to thereby urge said cutting wire against said pipe, a detector for detecting a bending of said cutting wire between said outer ends, and a control responding to said detector and connected to said feed drive wherein a feed rate is varied with cutting wire bending, said one of said wheels has first and second spaced apart large diameter side walls and a smaller diameter annular floor between said side walls, said one of said wheels further having a first wheel portion including said first large diameter side wall and said annular floor, said first wheel portion attached to a shaft on said device, said one of said wheels also having a second wheel portion including said second larger diameter side wall, said second wheel portion attachable to said first wheel portion by one or more removable fasteners, and an annular insert between said spaced apart side walls and around said annular floor wherein said annular insert is replaceable by removing said plurality of removable fasteners and removing said second wheel portion without removing said first wheel portion from said shaft.

6. The device of claim 5 wherein one of said first and second arms has a roller at a distal end thereof for rolling along a surface of said length of pipe.

7. A device for working a length of pipe comprising:

a frame, a clamp portion on said frame, said clamp portion including a plurality of pads for contacting a surface of said pipe, said clamp portion also including at least one moveable arm for extending around said pipe and retaining said pipe against said plurality of pads, said at least one moveable arm including an upper arm portion and a lower arm portion moveable with respect to said upper arm portion, a cylinder between said upper arm portion and said lower arm potion for moving said lower arm portion with respect to said upper arm portion, said frame having a plurality of mounting locations thereon for receiving said moveable arm at any one of said plurality of mounting locations wherein said moveable arm will grasp a range of sizes of pipe at each of said mounting locations that is different from a range of sizes of pipe that can be grasped at any other of said plurality of mounting locations, a machining portion linearly moveable with respect to said clamp portion, said machining portion for working said length of pipe, a feed drive connected between said clamp portion and said machining portion for moving said machining portion relative to said clamp portion to thereby urge said machining portion against said pipe, wherein said machining portion is a wire saw having a bow having a pair of bow arms with spaced apart outer ends for extending around a diameter of said pipe, a wheel on each of said outer ends, a cutting wire loop on said wheels, a motor on said bow for rotating said cutting wire loop around said rollers, a take-up wheel on said bow and engaging said cutting wire loop, a feed driver connected between said clamp portion and said bow for moving said bow relative to said clamp portion to thereby urge said cutting wire against said pipe, a detector for detecting a bending of said cutting wire between said outer ends, and a control responding to said detector and connected to said feed drive wherein a feed rate is varied with cutting wire bending.

8. The device of claim 7 wherein said clamping portion includes two moveable arms each having an upper arm portion, a lower arm portion and a cylinder for moving said lower arm with respect to said upper arm, and said device further comprises a mechanical synchronization between said cylinders of said two moveable arms wherein said lower arms move in unison to encircle said length of pipe.

9. The device of claim 7 wherein said machine portion is one of a drill, a guillotine saw, and a wire saw having a bow with a moveable cutting wire rotatably mounted thereon.

10. The device of claim 7 wherein one of said wheels has first and second spaced apart large diameter side walls and a smaller diameter annular floor between said side walls, said one of said wheels having a first wheel portion including said first large diameter side wall and said annular floor, said first wheel portion attached to a shaft on said device, said one of said wheels having a second wheel portion including said second larger diameter side wall, said second wheel portion attachable to said first wheel portion by one or more removable fasteners, and an annular insert between said spaced apart side walls and around said annular floor wherein said annular insert is replaceable by removing said plurality of removable fasteners and removing said second wheel portion without removing said first wheel portion from said shaft.

11. The device of claim 10 wherein said one of said wheels is enclosed in a clamshell having a first half clamshell extending around said first wheel portion and a second half clamshell extending around said second wheel portion and wherein said first half clamshell will remain attached to said device while said second half clamshell and said second wheel portion are removed to replace said annular insert.

\* \* \* \* \*